Nov. 17, 1953     M. B. LAYNE ET AL     2,659,260

WORK HOLDING TOOL

Filed April 11, 1949     4 Sheets-Sheet 1

INVENTORS,
Mark B. Layne,
Lawrence L. Held.
BY
Roy E. Hamilton,
Attorney.

Nov. 17, 1953
M. B. LAYNE ET AL
2,659,260
WORK HOLDING TOOL
Filed April 11, 1949
4 Sheets-Sheet 2
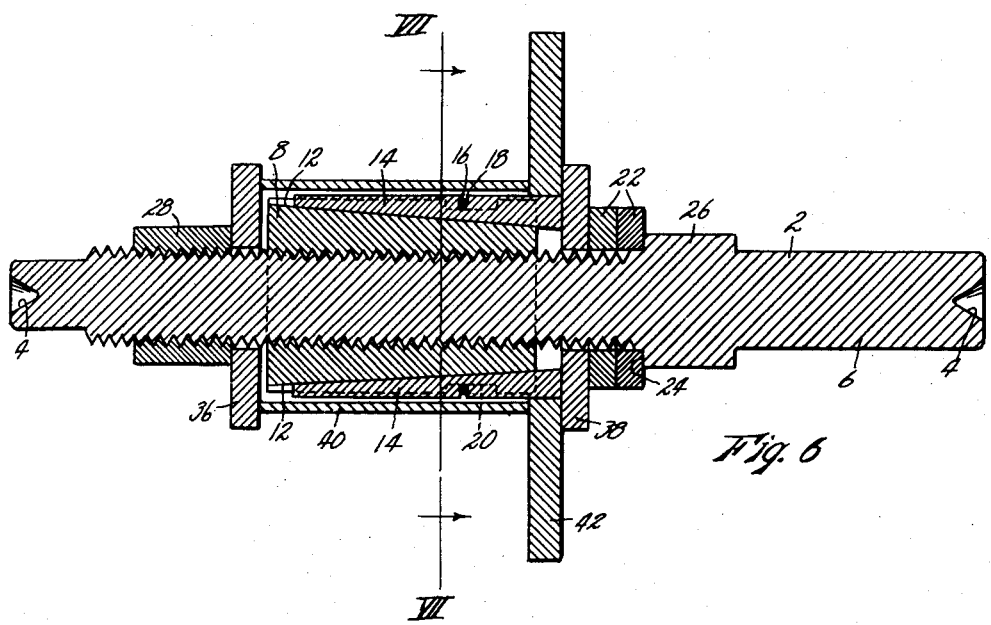
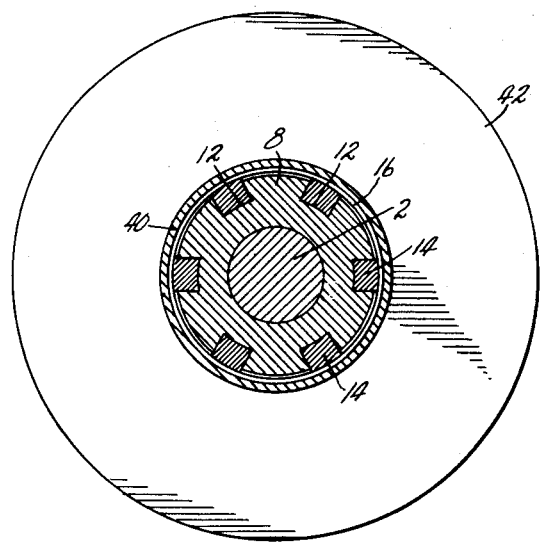
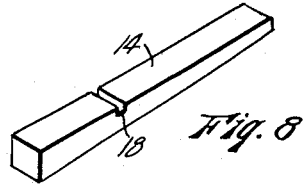
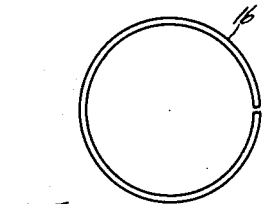
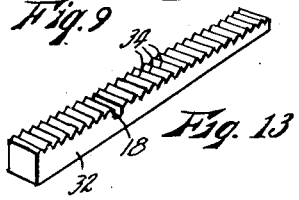
INVENTORS,
Mark B. Layne,
Lawrence L. Held,
BY
Roy E. Hamilton,
Attorney.

Nov. 17, 1953 M. B. LAYNE ET AL 2,659,260
WORK HOLDING TOOL
Filed April 11, 1949 4 Sheets-Sheet 3
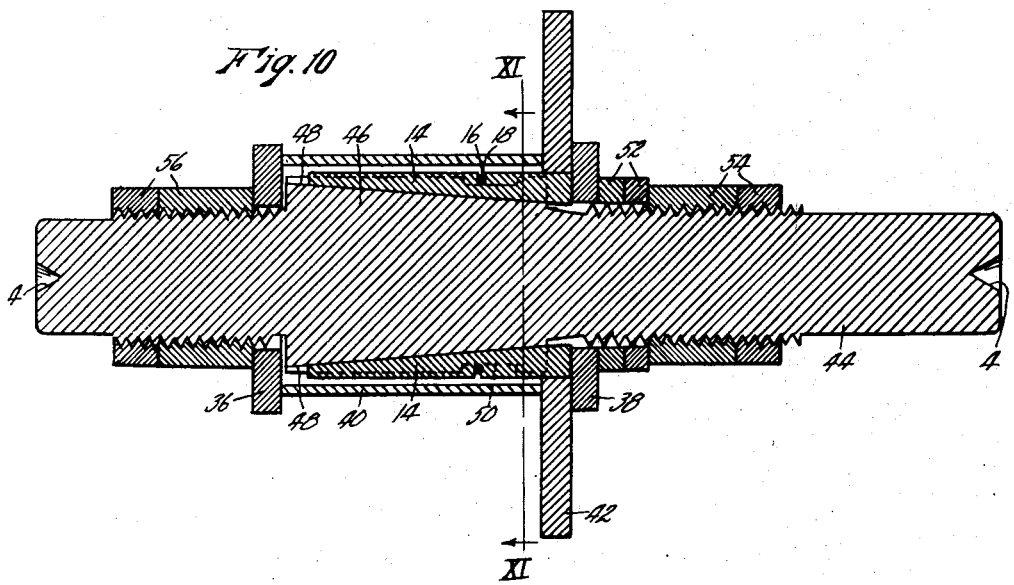
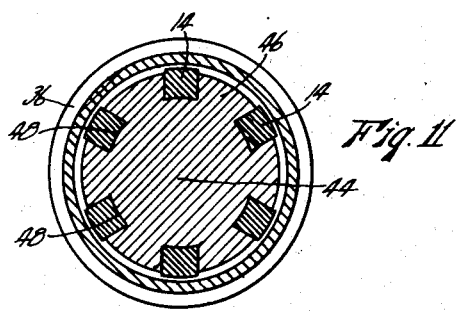
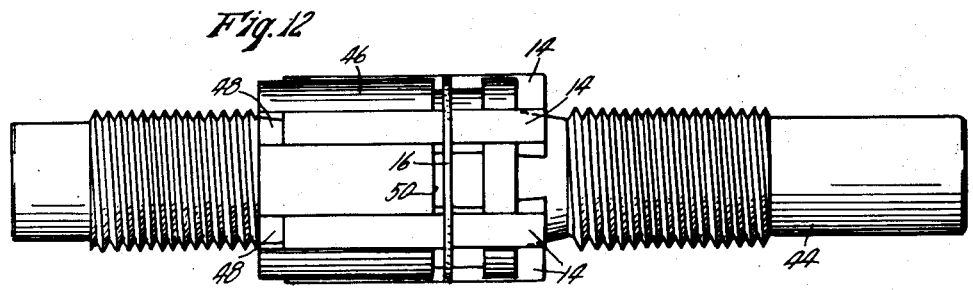
INVENTORS,
Mark B. Layne,
Lawrence L. Held.
BY
Roy E. Hamilton,
Attorney.

Nov. 17, 1953 M. B. LAYNE ET AL 2,659,260
WORK HOLDING TOOL
Filed April 11, 1949 4 Sheets-Sheet 4

INVENTORS,
*Mark B. Layne,*
BY *Lawrence L. Held*
*Roy E. Hamilton,*
*Attorney.*

Patented Nov. 17, 1953

2,659,260

UNITED STATES PATENT OFFICE 2,659,260

WORK HOLDING TOOL

Mark B. Layne and Lawrence L. Held,
Higginsville, Mo.

Application April 11, 1949, Serial No. 86,734

7 Claims. (Cl. 82—44)

1

This invention relates to new and useful improvements in work holding tools, and has particular reference to work holding tools of the class adapted to hold objects having cylindrical holes formed therethrough by means of an internally positioned expandible member.

The principal object of the present invention is the provision of a work holding tool comprising a mandrel suitable for being held in a lathe, chuck, drill press, vise, or the like, and having wedges adapted to move radially outwardly from said mandrel concentrically therewith, whereby to grip internally an object placed over said mandrel, and to center said object relative to said mandrel. In this manner the entire outer surface of a tubular member may be turned, threaded, or otherwise formed, and if the walls of the tubular member are thin, they will be supported by said expandible wedges against the stresses set up by the forming operations.

Another object is the provision, in a work holding tool of the class described, of means for supporting and bracing the work in a direction parallel to the axis of the mandrel as well as radially. In this manner thin plate or sheet stock may be gripped and held in a plane at right angles to the axis of the mandrel.

A further object is the provision of a conical face plate or collar coaxial with and movable along the mandrel and adapted to engage and center a tubular member carried by said mandrel, the other end of said tubular member being centered about the expanding wedges. In this manner the tool is adapted to grip work which is substantially longer than the gripping wedges.

Other objects are simplicity and economy of construction, ease and efficiency of operation, and adaptability for a wide variety of uses.

With these objects in view, as well as other objects which will appear in the course of the specification, reference will be had to the drawing, wherein—

Fig. 6 is a longitudinal section through the

2 device, shown with the adaptations necessary for holding plate stock.

Fig. 7 is a transverse cross-section taken on line VII—VII of Fig. 6.

Fig. 8 is a perspective view of one of the wedges.

Fig. 9 is a face view of the wedge retaining ring.

Fig. 10 is a longitudinal section through a modified form of the tool, showing a piece of plate work gripped thereby.

Fig. 11 is a sectional view taken on line XI—XI of Fig. 10.

Fig. 12 is a side elevation of the tool shown in Fig. 10, showing only the mandrel, wedges, and wedge retaining ring.

Fig. 13 is a perspective view of a modified form of wedge.

Figure 14:
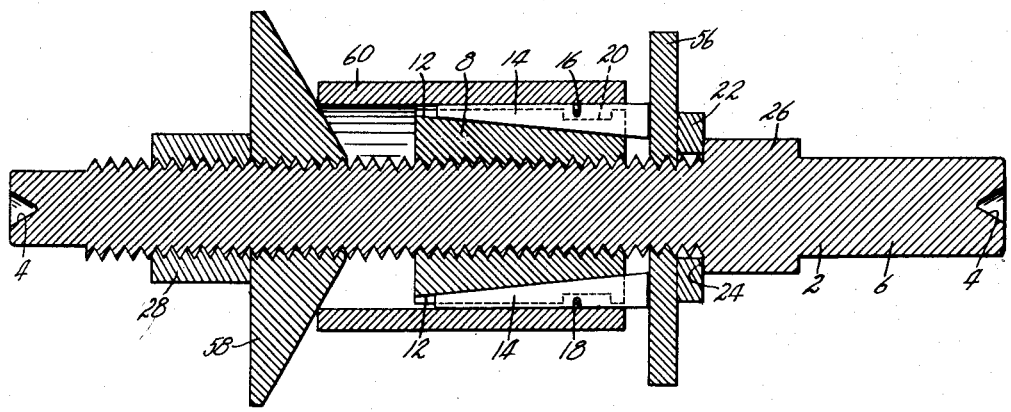

Fig. 14 is a longitudinal section of another modification of the tool adapted to grip and center tubular work substantially longer than the gripping wedges.

Figure 15:
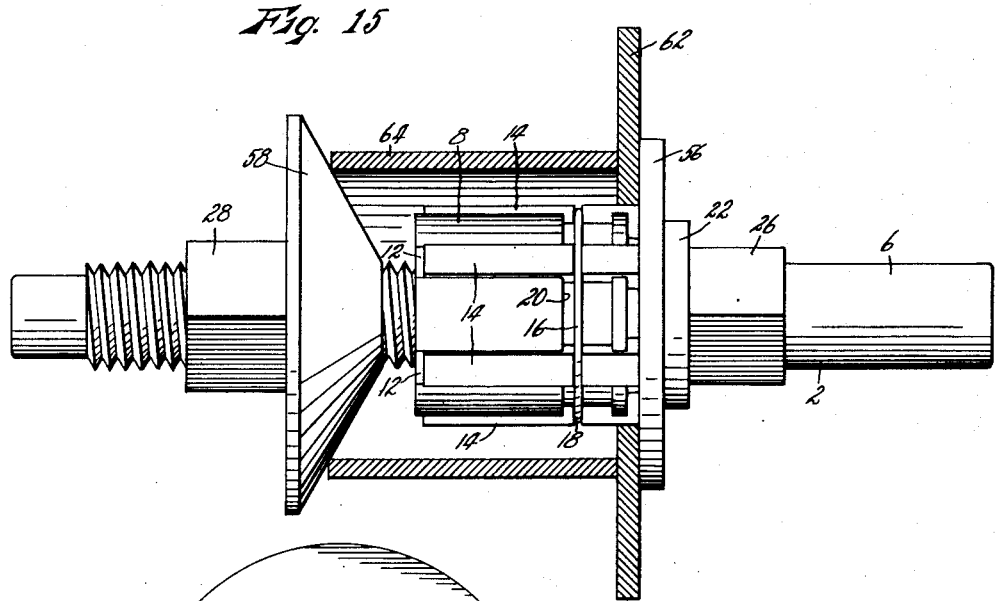

Fig. 15 is a side elevation of the tool shown in Fig. 14, shown holding a thin piece of planar work.

Figure 16:
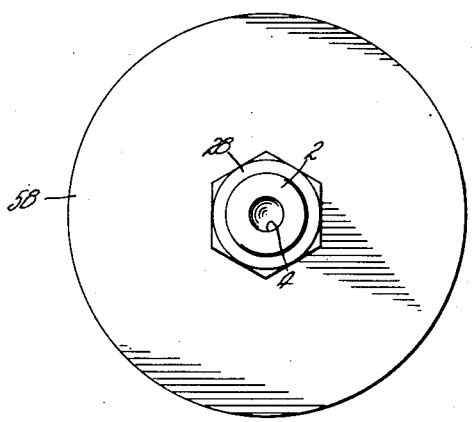

Fig. 16 is a left end view of the device shown in Fig. 15.

Like reference numerals apply to similar parts throughout the several views, and the numeral 2 applied to a mandrel having countersunk recesses 4 disposed centrally in its opposite ends whereby said mandrel may be mounted between lathe centers. One end portion 6 of said mandrel is provided with a smooth surface, and is adapted to be gripped in a chuck, drill press, vise, or the like. The major portion of said mandrel is threaded. A cylindrical body member 8 is provided with an internally threaded axial bore 10 which adapts said body member to be threaded on to the mandrel. The peripheral surface of said body member is formed to present a plurality of longitudinal grooves 12 spaced equally about the circumference of said body member, and tapering evenly in depth from one end of said body member to the other. While six grooves are shown in the drawing, it is apparent that a larger or smaller number could be used if desired.

Figure 1:
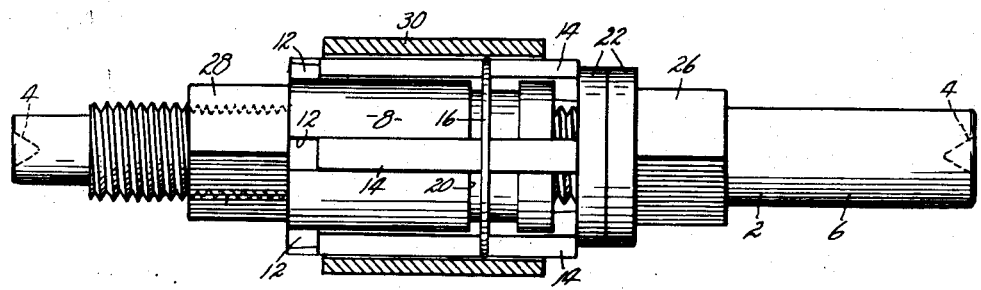
Figure 1 is a side elevation of a work holding tool embodying the present invention, a piece of tubular work which is shown in longitudinal section, being held by said tool.
Figure 2:
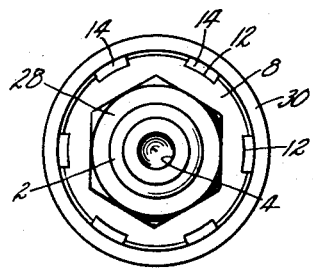
Fig. 2 is a left end view of the device as shown in Fig. 1.
Figure 3:
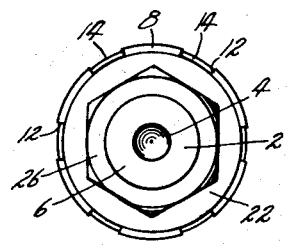
Fig. 3 is a right end view of the device shown in Fig. 1, with the work removed and with the wedges retracted beneath the surface of the body member.
Figure 4:
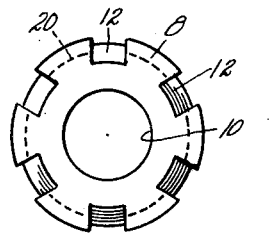
Fig. 4 is an end view of the body member.
Figure 5:
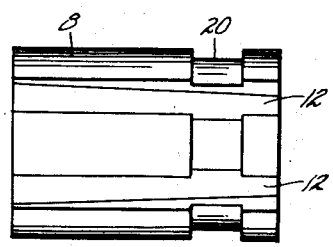
Fig. 5 is a side view of the body member.

Carried slidable in each of grooves 12 is an elongated wedge 14 having its inner surface tapered correspondingly to the base of said grooves, and having its outer surface parallel with the axis of the mandrel and body member. When said wedges are moved toward the shallow ends of grooves 12, their outer edges will project outwardly from the surface of body member 8, as shown in Figs. 1 and 2, and when said wedges are moved toward the deep ends of grooves 12, their outer edges will be retracted beneath the surface of said body member, as shown in Fig. 3. Wedges 14 are retained at all times in grooves 12 by means of a split ring 16 formed of resilient wire or other suitable material. Said retaining ring encircles body member 8 circumferentially, and engages a transverse notch 18 formed in the outer surface of each of the wedges. Said notches provide that ring 16 shall be disposed inwardly from the outer surfaces of said wedges, so as not to interfere with the gripping action of said wedges. A relatively broad peripheral groove 20 is formed about body member 8 adjacent the deep ends of grooves 12 for accommodating ring 16 and permitting limited longitudinal movement of wedges 14 relative to the body member.

Wedges 14 are so proportioned as to project outwardly at all times from the deep ends of grooves 12, and are adapted to abut at their outer ends against one of a pair of friction collars 22 carried loosely on mandrel 2 as shown in Fig. 1. Said collars in turn abut against a shoulder 24 formed integrally with said mandrel. A lock nut 28 is carried on mandrel 2 at the opposite end of body member 8.

The operation of the tool in holding a tubular member, as shown in Figs. 1 and 2, is substantially as follows. Lock nut 28 is backed off and body member 8 is screwed away from collars 22 until wedges 14 can be slid toward the deep ends of grooves 12 sufficiently to retract the outer edges of said wedges below the surface of said body member. A tubular piece of work 30 may then be slipped loosely over the body member. Body member 8 is then screwed toward collars 22 until the outer ends of wedges 14 strike said collars and are forced thereby toward the shallow ends of grooves 12. Said wedges are forced outwardly by the tapered bottoms of grooves 12 until the outer surfaces of said wedges contact and grip the work 30 firmly. Lock nut 28 may then be turned up against body member 8 to secure it in position. The use of collars 22 distributes the load exerted on the wedge ends over a broader area, and thereby permits easier movement of body member 8 to and from its wedging position. The modified wedge 32 shown in Fig. 13 is similar to wedge 14 except that its outer surface is formed to present a series of transverse ridges or teeth 34, which provide a firmer grip on the work, or which could be made to correspond to the threads of an internally threaded piece of work so as to grip said work without damaging the threads. It is to be understood that the outer surfaces of the wedges can be made to conform to the internal contours of the work to be held.

Use of the device to hold a planar piece of work at right angles to the axis of the mandrel, as shown in Figs. 6 and 7, requires the use of a pair of annular face plates 36 and 38 carried on mandrel 2 and having outer diameters somewhat larger than the diameter of body member 8, and a hollow cylindrical sleeve 40 having an internal diameter greater than the maximum diameter of wedges 14. Face plates 36 and 38 are disposed respectively between body member 8 and lock nut 28, and between body member 8 and friction collars 22. The piece of planar work 42, illustrated as an annular ring of plate stock, is positioned about wedges 14 and the wedges expanded by screwing body member 8 toward collars 22 in the usual manner, with the work abutting against face plate 38. However, due to the short contact between the work and the wedges, the work is not thereby firmly held against tilting movement relative to the axis of the mandrel. To overcome this, sleeve 40 is positioned about body member 8, abutting at one end against the work 42 and at its opposite end against face plate 36. Lock nut 28 may then be tightened, whereby the work is gripped firmly between sleeve 40 and face plate 38. It will be noted that sleeve 40 is sufficiently long to provide clearance between face plate 36 and body member 8.

In the modified form of the tool shown in Figs. 10–12, the mandrel 44 and body member 46 are integral, the latter being formed merely as an enlargement of the former. The mandrel is threaded adjacent both ends of the body member. The body member is provided with longitudinal grooves for carrying wedges 14, and with a peripheral groove 50 for accommodating the wedge retaining ring 16, in the same manner as in the preferred form. In Figs. 10 and 11, the device is shown equipped with face plates 36 and 38 and sleeve 40 for holding a piece of planar work 42, as in Fig. 6. Friction collars 52 are supported and advanced by lock nuts 54 threaded on one end of the mandrel. Face plate 36 is supported and advanced by lock nuts 56 threaded on the opposite end of the mandrel. Wedges 14 are of course advanced toward the shallow ends of grooves 48 by advancing lock nuts 54 to the left along the mandrel, as viewed in Fig. 10, instead of advancing the body member along the mandrel as in the preferred form. The construction and operation of the modified form is otherwise similar to that of the preferred form. The modified form is adapted by its design for heavy duty work, and is also adapted particularly for handling small work, due to the compactness made possible by forming the mandrel and body member integrally.

The modified form shown in Figs. 14–16 is adapted to hold longer tubular work and larger planar work than is the preferred form. It is substantially similar in construction to the preferred form except that face-plate 56, which corresponds to face plate 38 of the preferred form, is threaded on mandrel 2, and face plate 58, which corresponds to face plate 36 of the preferred form, is conical, being threaded on mandrel 2 and tapering toward body member 8. The conical section is coaxial with the mandrel. Only a single friction collar 22 is deemed necessary.

In using this modification of the tool to grip tubular work 60 substantially longer than wedges 14, as shown in Fig. 14, one end of the work is gripped by the wedges 14 in the usual manner, with the portion thereof unsupported by said wedges extending toward face plate 58. Said face plate is then screwed along the mandrel until the conical portion thereof enters and contacts the free end of the work, and the face plate is held in position by lock nut 28. Thus both ends of the work are securely held and centered, and can be turned or otherwise formed without deforming.

Use of the modified tool for holding planar work is illustrated in Fig. 15. The work 62 is centered by wedges 14 in the usual manner, being positioned against face plate 56, and is supported parallel to the axis of the mandrel by a sleeve 64 held between the work and the conical surface of face plate 58. Said conical face plate keeps the sleeve substantially centered. Threading the face plates on the mandrel supports them firmly relative to said mandrel and eliminates the possibility of tilting on the mandrel. These features permit the holding of larger pieces of planar work, since the face plates may be of longer diameter, and since the sleeve 64 may be of larger diameter to contact the work farther from the center.

While we have shown certain specific embodiments of our invention, it is readily apparent that many minor variations of construction and operation could be made without departing from the spirit of the invention.

What we claim is:

1. A work holding tool comprising a mandrel having an end portion adapted to be held by a gripping tool, a cylindrical body member carried by said mandrel coaxially therewith, said body member having peripherally spaced longitudinal grooves formed therein, said grooves being of uniformly tapered depth, an elongated wedge carried slidably in each of said grooves, means for advancing all of said wedges simultaneously toward the shallow ends of said grooves, whereby said wedges are extended radially from said body member to grip a piece of work disposed about said body member, a face plate carried movably on said mandrel adjacent each end of said body member and extending outwardly beyond said body member, a tubular member encircling said body member and extending between said work and one of said face plates, and means for moving said face plates relatively toward each other, whereby said work is gripped therebetween.

2. A work holding tool comprising a mandrel having an end portion adapted to be held by a gripping tool, a cylindrical body member carried by said mandrel coaxial therewith, said body member having peripherally spaced longitudinal grooves formed therein, said grooves being of uniformly tapered depth, an elongated wedge carried slidably in each of said grooves, means for advancing all of said wedges simultaneously toward the shallow ends of said grooves, whereby said wedges are extended radially from said body member to grip a piece of work disposed about said body member, a face plate adjacent each end of said body member and extending outwardly beyond said body member, a sleeve disposed loosely about said body member between said face plates, and means for moving said face plates relatively toward each other whereby said work is gripped between said sleeve and one of said face plates.

3. A work holding tool comprising a mandrel having an end portion adapted to be held by a gripping tool, a cylindrical body member carried by said mandrel coaxially therewith, said body member having peripherally spaced longitudinal grooves formed therein, said grooves being uniformly tapered depth, an elongated wedge carried slidably in each of said grooves and extending outwardly from the deeper end of said groove, a face plate carried on said mandrel and abutting against the extended ends of said wedges, means for moving said face plate and said body member relatively closer together whereby said wedges are extended, a second face plate carried on said mandrel adjacent the opposite end of said body member, a sleeve carried loosely on said body member between said face plates, and means for moving said second face plate toward said first mentioned face plate, whereby said work is gripped between said sleeve and the first mentioned of said face plates.

4. A work holding tool comprising a mandrel having an end portion adapted to be held by a gripping tool, a cylindrical body member threaded on said mandrel coaxially therewith, said body member having a plurality of peripherally spaced longitudinal grooves formed in the surface thereof, said grooves being of uniformly tapered depth, an elongated wedge carried slidably in each of said grooves and extending outwardly from the deeper end of said groove, a face plate of larger diameter than said body member disposed in fixed position on said mandrel and abutting against the extended ends of said wedges, a second face plate carried movably on said mandrel adjacent the opposite end of said body member, means for advancing said second face plate toward said body member, and a cylindrical sleeve disposed loosely on said body member between said face plates.

5. A work holding tool comprising a mandrel having an end portion adapted to be held by a gripping tool, a cylindrical body member threaded on said mandrel coaxially therewith, said body member having a plurality of peripherally spaced longitudinal grooves formed in the surface thereof, said grooves being of uniformly tapered depth, an elongated wedge carried slidably in each of said grooves and extending outwardly from the deeper end of said grooves, a face plate of larger diameter than said body member threaded on said mandrel and abutting against the extended ends of said wedges, a second face plate threaded on said mandrel adjacent the opposite end of said body member, and a cylindrical sleeve disposed about said body between said face plates.

6. A work holding tool comprising a mandrel having an end portion adapted to be held by a gripping tool, a cylindrical body member threaded on said mandrel coaxially therewith, said body member having a plurality of peripherally spaced longitudinal grooves formed in the surface thereof, said grooves being of uniformly tapered depth, an elongated wedge carried slidably in each of said grooves and extending outwardly from the deeper end of said grooves, a face plate of larger diameter than said body member threaded on said mandrel and abutting against the extended ends of said wedges, a second face plate threaded on said mandrel adjacent the opposite end of said body member, said second face plate having the form of a cone coaxial with said mandrel and tapering toward said body member, and a sleeve disposed loosely about said body member between said face plates.

7. A work holding tool comprising a mandrel having an end portion adapted to be held by a gripping tool, a cylindrical body member threaded on said mandrel coaxially therewith, said body member having a plurality of peripherally spaced longitudinal grooves formed in the surface thereof, said grooves being of uniformly tapered depth, an elongated wedge carried slidably in each of said grooves and extending outwardly from the deeper end of said groove, and an abutting member carried in fixed position on said mandrel and normally abutting against the extended ends of said wedges, whereby as said body member is advanced along said mandrel toward said abutment member, said wedges will be extended radially outwardly from said body member, and a face plate threaded on said mandrel in spaced relation from the opposite end of said body member, said face plate having the form of a cone coaxial with said mandrel and tapering toward said body member.

MARK B. LAYNE.
LAWRENCE L. HELD.

References Cited in the file of this patent

UNITED STATES PATENTS

| Number | Name | Date |
|---|---|---|
| 255,010 | Nicholson | Mar. 14, 1882 |
| 447,667 | Dubrule | Mar. 3, 1891 |
| 573,325 | Gates | Dec. 15, 1896 |
| 794,411 | Jones | July 11, 1905 |
| 1,159,998 | Saunders | Nov. 9, 1915 |
| 1,654,737 | Kistner | Jan. 3, 1928 |
| 1,944,255 | McFall | Jan. 23, 1934 |
| 2,255,885 | Herbst | Sept. 16, 1941 |
| 2,544,633 | Le Count | Mar. 6, 1951 |

FOREIGN PATENTS

| Number | Country | Date |
|---|---|---|
| 9,302 | Great Britain | 1887 |

OTHER REFERENCES

Page 2209 of "Invention," issue of November 13, 1886.